(No Model.)
H. W. WILDT.
SPECTACLE FRAME.
No. 520,347.  Patented May 22, 1894.
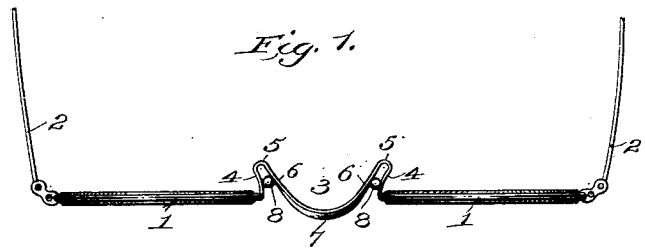
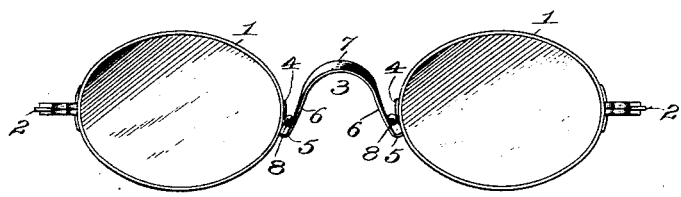
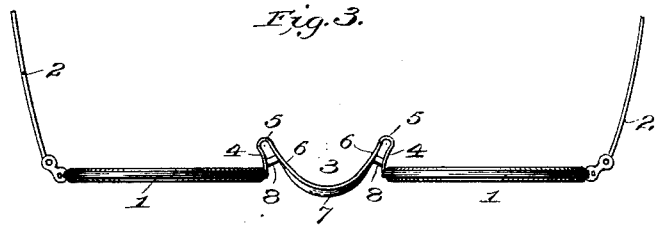
Witnesses:
Harry S. Rohner
Walter E. Allen
Inventor:
Henry W. Wildt
By Knight Bros
Attys.

United States Patent Office.

HENRY W. WILDT, OF ALEXANDRIA, VIRGINIA.

SPECTACLE-FRAME.

SPECIFICATION forming part of Letters Patent No. 520,347, dated May 22, 1894.

Application filed December 18, 1893. Serial No. 493,905. (No model.)

*To all whom it may concern:*

Be it known that I, HENRY W. WILDT, a citizen of the United States, residing at Alexandria, in the county of Alexandria and State of Virginia, have invented a certain new and useful Improvement in Spectacles, of which the following is a specification.

My invention relates to spectacle frames wherein the rims are intended to be held rigidly with relation to the bridge, and especially to that class of frames employing what is known as the saddle-bridge in which, in order to obtain the desired shape for fitting the nose, the bridge extends rearwardly from each rim and is then turned at a sharp angle and doubled upon itself to form the nose rest in a line at right angles to the nose of the wearer. The construction necessary to obtain this form of bridge is necessarily a weak one owing to the sharp turns referred to and it frequently occurs that in cleaning the glass by rubbing it back and forward in the line of its longest axis, the frame is bent at the sharp angle turn and repeated bending at such point finally results in breaking.

All danger of breaking is avoided by my invention which consists in inserting between the overlapped parts of the bridge-piece, a bond or tie of any suitable kind which will receive all the lateral strain put upon the bridge-piece on each side and entirely relieve the sharp turn of such strain and transmit the same to the curved portion of the bridge, over which it will naturally be distributed by reason of the shape of the same. The bond or tie consists of a small ball or pellet of suitable material or of any equivalent means which may be conveniently inserted between the overlapped portions of the bridge.

My invention will be fully understood upon reference to the accompanying drawings, in which—

Figures 1 and 2 are respectively a top plan and a front view of a spectacle frame having my improvement attached thereto, and Fig. 3 is a view similar to Fig. 1, showing a modification.

1—1 represent the rims, 2 the temples and 3 the bridge for rigidly connecting the rims and which is shown in the form of a saddle-bridge, to which form of bridge my invention has special application because of the difficulty of making such form of sufficient strength without employing too much weight of metal. This form of bridge extends from each rim rearwardly at 4, and is then turned at a sharp angle 5 to form the overlapping portions 6 and the nose piece 7. The parts 6 and 7 extend at various angles between the perpendicular and horizontal lines in order to fit the nose, and this form of bridge necessarily involves weak points at 5 unless the metal is made very heavy.

To permit the use of light frames without sacrificing the strength and durability of the frame, I insert bonds or ties 8 between the overlapped portions 4 and 6 of the bridge and substantially in line with or in a line parallel to the long axes of the rims. These bonds or ties are preferably in the form of a small sphere or pellet as shown, because this form is best adapted for meeting the opposite points of the overlapped portions of whatever form they may be and produces the neatest appearance, but they may also be of any geometrical figure which may be deemed available without destroying the neat appearance of the frame. These bonds or ties may be inserted by soldering or in any other suitable manner. A bond in the form of a bar is shown in Fig. 3. It will be understood that the frame thus constructed avoids all liability of breaking at the sharp angle bends 5 for the reason that the bonds or ties are in position to receive all the lateral thrust placed upon the frames when the lenses are cleaned by rubbing in a line with the long axis.

I do not limit myself to the particular form of saddle-bridge as there may be other forms having similar weak points to which my invention may be as readily applicable for the purpose intended.

Having thus described my invention, the following is what I claim as new therein and desire to secure by Letters Patent:

1. In combination with a spectacle frame having a bridge or nose piece formed with the overlapping portions 4 and 6, the herein-described bond or tie projecting from the part 4 to the part 6 and attached to each for the purpose of maintaining them in relative position as explained.

2. In a spectacle frame the combination of the saddle-bridge or nose piece 3 having the rearwardly extending portions 4, the sharp angle turns 5 and the forwardly extending nose rest overlapping the portions 4, and the herein-described bond or tie inserted between the portions 4 and 6 substantially in the manner and for the purpose set forth.

3. In a spectacle frame the combination with the bridge or nose piece, of the herein-described strengthening bond or tie consisting of a ball or sphere inserted between the overlapped portions of said bridge or nose piece and secured to each for the purpose of spacing them relatively, substantially as explained.

HENRY W. WILDT.

Witnesses:
HERVEY S. KNIGHT,
GEO. E. CRUSE.